United States Patent [19]
Weaver

[11] Patent Number: 5,427,325
[45] Date of Patent: Jun. 27, 1995

[54] DRAG SYSTEM FOR SPIN-CAST REELS

[75] Inventor: Robert E. Weaver, Tulsa, Okla.

[73] Assignee: Zebco Corporation, Tulsa, Okla.

[21] Appl. No.: 986,987

[22] Filed: Dec. 8, 1992

[51] Int. Cl.⁶ .......................................... A01K 89/027
[52] U.S. Cl. .................................................... 242/244
[58] Field of Search .............................. 242/244–246, 242/234–239, 302

[56] References Cited

U.S. PATENT DOCUMENTS

| | | | |
|---|---|---|---|
| 2,719,680 | 10/1955 | Denison et al. | 242/244 |
| 3,061,230 | 10/1962 | Gayle | 242/244 X |
| 4,343,442 | 8/1982 | Andersson | 242/244 |
| 4,362,763 | 12/1982 | Puryear et al. | 427/44.1 |
| 4,378,914 | 4/1983 | Shakelford et al. | 242/84.21 A |
| 4,408,729 | 10/1983 | Moss et al. | 242/84.5 A |
| 4,416,427 | 11/1983 | Kawai | 242/244 |
| 4,431,143 | 2/1984 | Moss et al. | 242/84.5 A |
| 4,474,341 | 10/1984 | Shackelford et al. | 242/84.21 A |
| 4,522,347 | 6/1985 | Swisher | 242/84.5 A |
| 4,549,702 | 10/1985 | Councilman | 242/84.51 A |
| 4,640,470 | 2/1987 | Ohler | 242/238 |
| 4,778,120 | 10/1988 | Finney et al. | 242/84.5 A |
| 4,778,123 | 10/1988 | Yoshikawa | 242/244 |
| 5,197,690 | 3/1993 | Hlava | 242/244 |
| 5,244,165 | 9/1993 | Valentine et al. | 242/244 |

FOREIGN PATENT DOCUMENTS 1152477  8/1983  Canada ................................ 242/244

*Primary Examiner*—Daniel P. Stodola
*Assistant Examiner*—Michael R. Mansen
*Attorney, Agent, or Firm*—Wood, Phillips, VanSanten, Clark & Mortimer

[57] ABSTRACT

A drag system for a spin-cast fishing reel having a line spool mounted upon a spindle extending axially of the reel deck, a drag plate for supplying axial drag pressure upon opposite sides of said spool, and a thumbwheel screw assembly for moving said drag plate. The drag plate straddles the spindle and has feet positioned on diametrically opposite sides of the line spool along a diameter of the same. The drag plate pivots about a fulcrum located between the thumbwheel screw assembly and the feet. The resulting balanced drag substantially eliminates force moments about the spool and associated spindle.

6 Claims, 2 Drawing Sheets

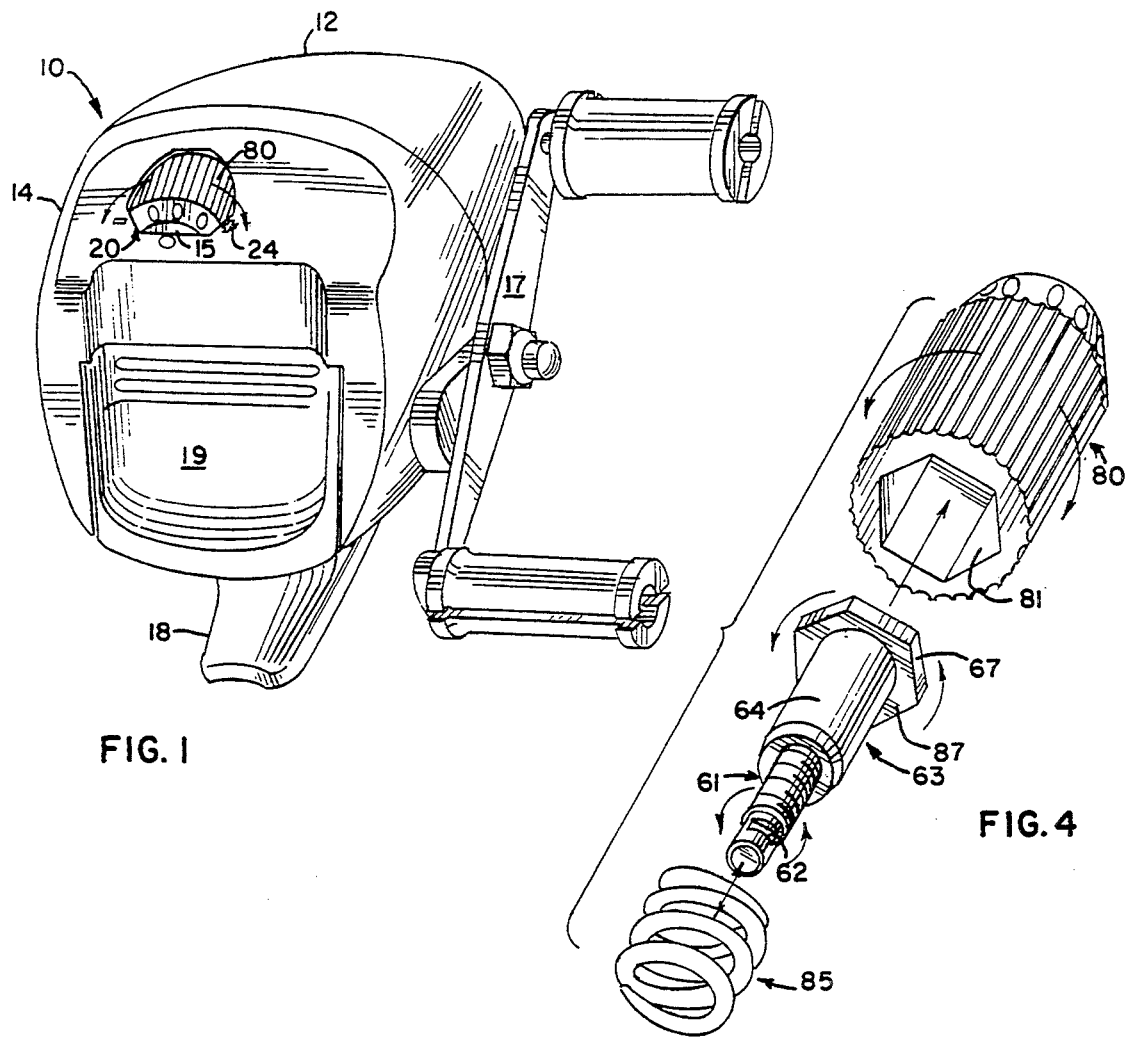
FIG. 1
FIG. 4
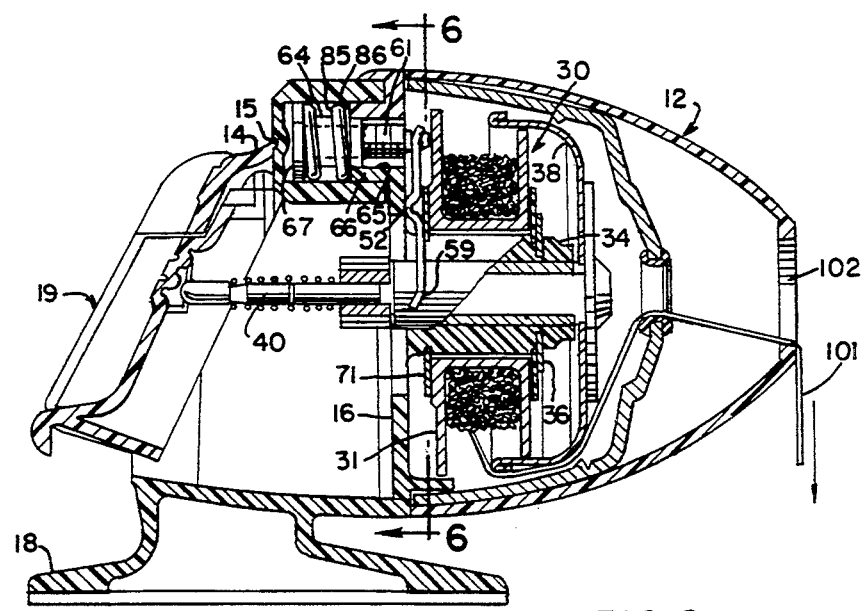
FIG. 2

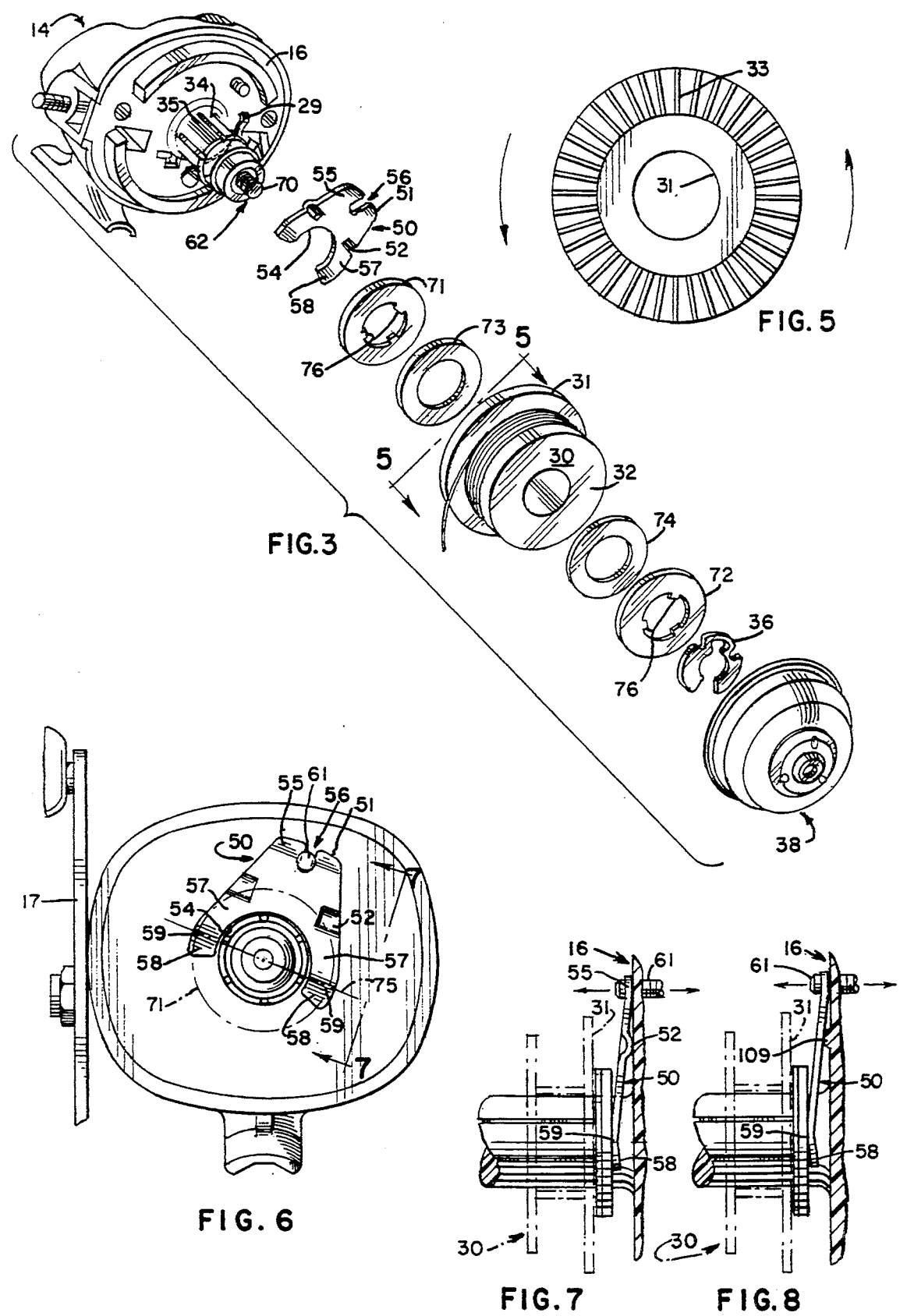

DRAG SYSTEM FOR SPIN-CAST REELS

TECHNICAL FIELD

This invention relates to spin-cast fishing reels of the type originally invented by and disclosed in U.S. Pat. No. 3,794,264 to the late R. D. Hull in which the line is carried on a spool mounted for rotation on a fore-and-aft axis of the reel and, more particularly, to a unique drag system which utilizes levered action to apply drag force to the spool of such reels.

BACKGROUND OF THE INVENTION

To control rotation of the line spool and thus the tension to which the line is subjected before or during retrieval of the catch, a drag mechanism is utilized. Such drag systems frequently apply drag forces directly or indirectly to the fore and aft radial surfaces of the line spool and thus act to retard its rotation. Representative drag systems are shown in U.S. Pat. No. 4,408,729 to Elvis W. Moss, in U.S. Pat. No. 4,378,914 to John T. Shackelford and more recently in U.S. Pat. No. 4,431,143 to Moss.

In each of the above patents, mechanisms are disclosed which apply pressure to the opposing radial surfaces of the line spool. Shackelford utilizes a relatively complex and expensive mechanism including a thumbwheel actuated by fore and aft movement of the thumb to apply drag pressure to the spool in a relatively uniform manner. More typical of the simple mechanisms utilized in less expensive reels is that disclosed in the Moss '729 patent, wherein a drag plate anchored to the reel body at the bottom is pushed at the top and so engages the spool in a manner that applies an axially asymmetric load upon the rear face of the spool. One attempt to apply uniform axial drag pressure to the spool is disclosed in the Moss '143 patent which employs a camming action to wedge a clutch plate against the spool. More recently, a drag mechanism described in U.S. Pat. No. 5,197,690 issued to Lorens G. Hlava on Mar. 30, 1993 entitled "Drag Actuation Structure for Fishing Reel" and assigned to the assignee of this application, applies axial drag pressure to opposite faces of a radial flange separated from, but integral with, the line spool.

SUMMARY OF THE INVENTION

The present invention comprises a drag mechanism for inhibiting rotation of a line-carrying spool relative to a supporting spindle extending forwardly of the reel body base deck. A drag clutch plate (hereinafter drag plate) is disposed between the base deck and the spool. The drag plate has a substantially planar body and legs extending downwardly therefrom that straddle the spindle supporting the line spool and terminate in feet that are positioned adjacent diametrically opposite sides of the aft face of the spool. A fulcrum is located between the top of the drag plate and its legs, so that aft motion of the top of the drag plate results in forward motion of that portion of the drag plate below the fulcrum, including in particular, its lower extremities or feet.

A thumbwheel actuated screw mechanism interacts with the top of the clutch plate to move the same fore and aft parallel to the longitudinal axis of the reel, thereby urging the feet of the drag plate, respectively, away from and toward the spool.

It is a principal object of the invention to apply balanced drag forces to the spool, either directly or through a drag washer. The balance of forces results from the positioning of the feet of the drag plate for contact with the aft face of the spool at points on diametrically opposite sides of the longitudinal axis of the spool. With the drag force so applied, no force moment is created upon the spool that would tend to cause the spool to cant upon the spindle or tend to bend the spindle with respect to the deck plate. Elimination of such bending forces, found in many prior art reels of this type, reduces the strain on the spindle and thus the junction of that spindle and the base deck. This reduction in strain permits lighter and potentially less expensive construction of the reel body without sacrifice in durability.

Another objective of the invention is to increase the range of drag force that may be applied to the line spool. This objective is achieved through the lever action of the clutch plate as it is pivoted about its associated fulcrum. Depending upon location of the fulcrum closer to or further away from the drag plate feet, the force applied to the top of the drag plate will be magnified at the feet to a greater or lesser degree, respectively. The invention thus provides the designer of a reel with a means of substantially magnifying the force applied by the drag adjustment screw, or, by moving the fulcrum toward the upper end of the drag plate for obtaining a greater range of movement of the drag feet for a smaller range of axial movement of the drag adjustment screw.

One aspect of the invention is that the drag plate is attached to the reel by its interaction with the drag adjustment screw and by its legs straddling the spool support spindle. The drag plate is retained in its operating position between the adjustment screw and the spindle by the line spool and its associated drag washers, eliminating the need for tabs or the like on the drag plate that interact with elements on the base deck to hold it in place.

Another aspect of the invention is the structure of the drag adjustment mechanism. A drag nut rides within the bore in a cylindrical boss extending from the base deck and is rotated by a thumbwheel which rides upon the boss. The drag adjustment screw is threaded into the drag nut. Flat mating surfaces of the drag screw and of a slot in the drag plate prevent the drag screw from rotating. Mating non-circular surfaces of the drag nut and interior of the thumbwheel enable the thumbwheel to exert rotational force upon the drag nut. Rotation of the thumbwheel and drag nut moves the drag screw (and top of the drag plate) fore or aft, effecting opposite movement of the drag plate feet as the drag plate pivots about its fulcrum. A coil spring disposed around the drag nut between its head and the base deck functions to hold the drag nut in position within the bore against the pull of the drag plate, and to resist turning of the thumbwheel as tension between the drag nut and screw is increased. As the thumbwheel is rotated clockwise from the fisherman's point of view, the drag screw is drawn aft into the nut and thereby increases the pressure of the drag plate feet on the drag washer abutting a rear radial face of the line spool.

The invention is intended to overcome problems with prior art line spool drags utilizing drag plates such as that illustrated in U.S. Pat. No. 4,408,729 issued to Elvis W. Moss on Oct. 11, 1983. In such prior art reels the drag plate pivots about its lower end when force is applied to its upper end, pushing the upper portion of the drag plate against the line spool retarding its rotation.

The main problem with such prior art drag systems occurs when the drag is increased to a high level. In such cases, the drag plate pushes more against the top of the drag washer than the bottom, tending to tilt the bottom of the drag washer away from the spool. The friction surface is thereby decreased, increasing the force needed upon the remaining drag surface to obtain the desired drag performance. This larger force makes the drag thumbwheel difficult to adjust. The drag plate pushing more on one side of the drag washer than the other produces a moment on the spool and the spindle supporting the spool. This moment causes deflection and high stresses in the body of the reel. The deflection at the end of the spindle may cause the pickup pin in the spinner head to hit the inside of the front cover of the reel. This interference, along with the large stresses on the body, makes it necessary to increase the strength and stiffness of the reel body. The stronger and stiffer the body must be, the harder it is to design and the more expensive it is to produce.

In the invention, the drag plate is configured to apply a balanced drag force to the spool substantially eliminating force moments on the spool and the spindle. Arms of the drag plate straddle the spindle and terminate in feet bent rearwardly of the spool. The axis of the bend is parallel to the diameter of the spool upon which the feet contact the spool or a washer positioned between the two, so as to deliver the drag pressure axially of the said spool and at points equidistant from the common longitudinal axis of the spindle and spool. The uniform load and lack of moment allows the friction surfaces of the drag mechanism to remain fully in contact with each other, which decreases the force needed to produce the same drag effect as the prior art devices.

BRIEF DESCRIPTION OF THE DRAWINGS

FIG. 1 is a right rear perspective view of a spin-cast reel embodying the invention;

FIG. 2 is a vertical cross-sectional view of the reel of FIG. 1;

FIG. 3 is an exploded view of the reel of FIG. 2 showing the elements of the drag mechanism of the invention;

FIG. 4 is an exploded view of the drag adjustment mechanism of the invention shown in FIG. 2;

FIG. 5 is a plan view of the inner face of the line spool of the invention taken along line 5—5 of FIG. 3;

FIG. 6 is a front view of the reel of FIG. 1 taken along line 6—6 of FIG. 2;

FIG. 7 is a partial cross-sectional view taken along line 7—7 of FIG. 6 and showing the line spool 30 in phantom;

FIG. 8 is a duplicate of FIG. 7 except that the fulcrum 52 on the drag plate 50 is replaced by a fulcrum 109 upon the deck 16.

DETAILED DESCRIPTION OF THE PREFERRED EMBODIMENT

Exclusive of the invention described herein. FIGS. 1 and 2 show a spin-cast type fishing reel 10 sold by Zebco Corporation under the trademark "Bullet". The reel has a front cover 12, a back cover 14, and a reel body or base deck 16 to which all of the operating mechanisms of the reel are attached. The back cover 14 incorporates an elongated foot 18 by which the reel is clamped onto a fishing rod. A thumbwheel 80 used as described below to adjust the drag extends partially through the back cover 14 and is held in position thereby. Markings 24 on the back cover 14 indicate increase (+) and decrease (−) in the drag setting.

FIGS. 2 and 3 illustrate the structure and functional interrelation of the parts of the invention. Basically, the line spool 30 is supported for limited rotation upon a spindle 34 extending forwardly of the base deck 16 and is held in place by a C-shaped retaining ring 36. The line retrieving spinner head 38 and associated line pick-up pin threads onto the forward end of the drive shaft 40 which extends through the spindle 34 and is rotated by a hand crank 17 and is actuated by a thumb button 19 as known in the art.

The overall configuration of the drag system is illustrated in FIG. 3. The elements are assembled upon the spindle in the order shown. The drag plate 50 is positioned astride the spindle 34 adjacent the deck 16. A non-rotating metal washer 71, keyed to the spindle 34, is positioned adjacent the drag plate 50. A washer of friction material 73, preferably of phenolic fiber, rides between the washer 71 and the aft face 31 of the spool 30. Another phenolic fiber washer 74 rides between the forward face 32 of the spool 30 and a forward non-rotating metal washer 72. A C-shaped retaining ring 36 holds the aforesaid elements in close axial relationship upon the spindle 34.

The drag system functions to restrain rotation of the spool 30 when a pull is exerted upon the line 101 wrapped therearound and lead out through the nose 102 of the front cover 12.

The drag plate 50 as illustrated in FIGS. 2, 6 and 7 is essentially a lever that pivots on a fulcrum formed by two raised areas 52 which may be pressed out of or otherwise formed on the aft surface of the plate 50 between the top or outer edge 51 and the bottom or inner feet 58 thereof. The top 51 of the drag plate 50 has a slot 56 cut or formed therein for operative engagement with a screw 61 of the drag adjusting mechanism 60. Specifically, vertical walls of the slot 56 engage flat surfaces of an under-cut section 62 at the forward end of the drag adjustment screw 61, so as to prevent the screw 61 from turning and to keep the outer edge 51 of drag plate 50 engaged upon the drag adjusting screw 61. The drag plate 50 is otherwise supported in the reel by its arcuate lower edge 54 resting loosely astride and partially around the spindle 34. The plate 50 has two legs 57 which loosely straddle the spindle 34 and in conjunction with its attachment to drag adjusting screw 61, prevent the drag plate 50 from rotating from its desired position. The desired position of the drag plate 50 is such that the feet 58 are positioned upon diametrically opposite sides of the spindle 34 and adjacent to the aft face of the aft metal washer 71. The feet 58 are bent aft so as to form a curved surface 59 on their forward faces. As the drag is applied, the planar body of the drag plate 50 assumes a slight angle with the plane of the aft washer 71, tilting aft about the fulcrum 52 so that curved surfaces 59 align with and contact the washer 71 on a diameter 75 thereof (see FIG. 6), which in the described construction extends through the longitudinal axis of the spindle 34, the washer 71 and the line spool 30. The washer 71 is shown in phantom in FIG. 6 to illustrate the position of the feet 58 and the curved surface 59 with respect thereto.

An upper portion 55 of the drag plate 50 is bent slightly forwardly of the plate 50, so as to increase the range of the aft movement of the top of the plate 50, and so that the upper portion 55 will lie flat against the deck 16 and the aft face of the under-cut 62 of the screw 61 when adjusted for reasonably heavy drag action.

Forward movement of the feet 58 of the drag plate 50 compresses the aft washer 71, the friction disk 73, the spool 30, the forward friction disk 74, and the forward washer 72 against the locking C-shaped retaining ring 36, thereby pressing the friction washers against the faces 31 and 32 of the line spool 30 and retarding rotation of the same.

Referring to FIG. 3, the spindle 34 has a series of radially spaced longitudinal channels or lands 35 therein, within which ride fingers 77 extending inwardly of the washers 71 and 72. Interaction of the lands 35 and fingers 76 prevent the washers 71 and 72 from rotating upon the spindle 34, thereby providing drag friction between the washers and the spool 30 and reducing wear between the drag plate 50 and the aft washer 71, and between the forward washer 72 and the C-shaped retaining ring 36.

A click spring 29 attached to the front face of base deck 16 interacts with a series of radial grooves 33 (see FIG. 5) in the after face 31 of the line spool 30 to produce a clicking sound when the spool 30 is caused to rotate by a pull on the line that exceeds the drag action achieved by the pressure of the drag assembly upon the spool 30. This sound indicates to the fisherman that the drag is slipping and may have to be tightened to reel in the catch.

Referring to FIGS. 2 and 4, the drag adjusting mechanism includes a drag adjusting nut 63 having an elongated cylindrical body 64 and a hexagonal head 67. A cylindrical boss 66 extending rearwardly of the base deck 16 has a bore 65 therein sized to accept the cylindrical body 64 of the nut 63 in a closely fitting relationship yet permit free rotation thereof. The boss 66 is preferably an integral part of the deck 16.

The interior of the cylindrical body 64 of nut 63 is threaded so as to receive therein the matchingly threaded drag actuating screw 61.

A thumbwheel 80 has a hexagonal bore 81 therein which accepts the boss 66 so that the boss 66 supports the thumbwheel 80 for rotation thereupon. The thumbwheel 80 is held in position upon the boss 66 by the forward edge 15 of an aperture 20 in the aft reel cover 14. An upper portion of the thumbwheel 80 extends above the back cover 14 so that the same may be rotated by the user's thumb.

The bore 81 in the thumbwheel 80 has a hexagonal cross-section configured to accept the hexagonal head 67 of the nut 63 so that rotation of the thumbwheel will also rotate the nut 63.

A coil spring 85 is disposed around the cylindrical body 64 of the nut 63 and between the aft end 86 of the boss 66 and the forward face 87 of the octagonal head 67 of the nut 63. As the thumbwheel and the entrapped hexagonal head 67 of the nut 63 are rotated clockwise, the screw 61 is drawn into the cylindrical body 64 of the nut 63, pulling the outer edge 51 of the drag plate 50 aft toward the base deck 16. As a result of this movement, the drag plate pivots about the fulcrums 52 and its feet 58 move forward and apply forward axial drag pressure upon the washer 71 and the spool 30 as described above. The reactive pressure of the washer 71 upon the feet 58 is transmitted to the screw 61 by the lever action of the drag plate 50 pivoting about its associated fulcrum 52, resulting in a force that pulls the screw 61 and the nut 63 forward into the bore 65 and against the compression spring 85. The head 67 of the nut 63 is free to slide fore and aft within the bore 81 of the thumbwheel 80 as the nut 63 moves fore and aft in response to adjustment of the drag force by rotation of the thumbwheel 80 as herein described. The increased frictional forces between the spring 85, the aft face of the boss 66 and the forward face 87 of the nut 63 as the drag pressure is increased makes it harder for the fisherman to rotate the thumbwheel and indicates to the fisherman the amount of drag force being applied to the spool. The aft end of the screw 61 (not shown) has a slot therein to enable adjustment of the position of the screw 61 within the nut 63.

It will be recognized by those skilled in the art that configurations of the drag plate, its associated fulcrum and drag actuating mechanism other than those set forth herein are possible without departing from the principles or spirit of the invention described herein. For example, as illustrated in FIG. 8, the fulcrum 109 may be attached to or be an integral part of the base deck 16 of the reel instead of the drag plate 50 without substantially effecting the operation of the invention.

Other aspects, objects and advantages of this invention can be obtained from a study of the drawings, disclosure and appended claims.

I claim:

1. In a spin-cast fishing reel of the type having a base deck, a spindle extending forwardly of the base deck, a line spool mounted for rotation on the spindle and a drag to retard rotation of the spool, an improved drag assembly comprising:

a drag plate comprising legs that extend partially around opposite sides of the spindle and between the base deck and the line spool;

a fulcrum between the base deck and the drag plate; and means for pivoting said drag plate about the fulcrum comprising:

a drag threaded actuating screw extending through the base deck;

means for attaching one end of the drag actuating screw to a distal portion of the drag plate opposite the legs so that the drag actuating screw is restrained from rotation; and nut means engaged upon the actuating screw for moving the screw fore and aft, and drag actuating thumbwheel means slidably mounted upon the nut means for rotating the nut means, whereby the screw and the attached distal portion of the drag plate may be moved fore and aft of the base deck so that the legs of the drag plate apply axial drag pressure to the line spool.

2. In a spin-cast fishing reel of the type having a base deck, a spindle extending forwardly thereof, a line spool mounted for rotation on said spindle and a drag to retard rotation of said spool, an improved drag assembly comprising:

a drag plate disposed substantially radially of said spindle and between said base deck and said line spool;

a fulcrum between said base deck and drag plate;

means for pivoting said drag plate about said fulcrum;

said drag plate comprising legs that extend partially around opposite sides of said spindle;

said means for pivoting said drag plate comprising:
- a drag actuating screw extending at least partially through said base deck;
- threaded means for receiving said screw;
- means for attaching one end of said screw to a distal portion of said drag plate opposite said arms so that said screw is restrained from rotation;
- means for rotating said threaded means whereby said screw and the attached distal portion of said drag plate may be moved fore and aft of said base deck;
- said threaded means for receiving said screw comprising a nut having a non-circular head portion and an elongate cylindrical axial portion, and said base deck having a bore therein configured to receive therein and support for rotation the cylindrical axial portion of said nut.

3. The drag assembly of claim 2 wherein said means for rotating said nut comprises:
- a thumbwheel having a non-circular bore therein configured to receive the non-circular head of said nut, and
- spring means positioned between the head portion of said nut and a rear face of said base deck to resist forward motion of said nut and clockwise rotation of said thumbwheel as the drag is applied.

4. In a spin-cast fishing reel of the type having a base deck, front and back housing, a spindle extending forwardly of the base deck, a line spool mounted for rotation on the spindle and a drag plate for exerting braking pressure upon the line spindle, means for moving the drag plate and thereby restraining rotation of the line spindle, comprising:
- a drag actuating screw;
- means for attaching one end of the screw to a distal portion of the drag plate so that the screw is restrained from rotation;
- a drag adjusting nut into which the drag actuating screw is threaded, the nut having a non-circular head;
- means for rotating the drag adjusting nut comprising a generally cylindrical thumbwheel having front and rear ends and an axial non-circular bore therein configured to receive the non-circular head of the drag adjusting nut;
- means for supporting the drag adjusting nut and the thumbwheel for rotation with respect to the base deck; and
- means for retaining the drag adjusting nut and the thumbwheel upon the supporting means.

5. The spin-cast fishing reel of claim 4 wherein the back cover of the reel has an aperture therein sized to receive therethrough a portion of the thumbwheel and having a forward facing wall in close proximity to the rear face of the thumbwheel, and wherein the means for retaining the thumbwheel upon the supporting means comprises the forward facing wall of the back cover.

6. The spin-cast reel of claim 5 wherein the thumbwheel is slidably engaged upon the supporting means and the drag adjusting nut.

* * * * *